INVENTOR
Don R. Anderson

United States Patent Office 3,491,336
Patented Jan. 20, 1970

3,491,336
BRAKING SIGNAL LIGHT FOR
AUTOMOTIVE VEHICLES
Don R. Anderson, 551 W. Clark St.,
Grantsville, Utah 84029
Continuation-in-part of application Ser. No. 461,428,
June 4, 1965. This application Feb. 27, 1967, Ser.
No. 650,556
Int. Cl. B60q 1/00
U.S. Cl. 340—84       2 Claims

ABSTRACT OF THE DISCLOSURE

The present invention comprises a light unit for vehicles such as automobiles. The light unit is connected to the braking system of the vehicle so as to present visual illumination through the front and side openings of the unit in response to brake application. A pair of lights are disposed within the unit but are separated by a physical septum or partition whereby light illumination originating laterally from points outside of the vehicle cannot be transmitted through the side windows of the unit. The physical septum or partition is so arranged as to obstruct such passage of light through both side windows of the unit. Yet, when the brakes are applied the braking illuminaiton will be seen not only forwardly but also on both sides of the light unit.

The present invention relates to brake light systems and, more particularly, to a new and improved brake light system which is uniquely adapted for mounting to the front of the vehicle, in the manner and for the purposes hereinafter indicated.

Brake light systems are, of course, not new in the art. In fact, every automobile is required to have a braking system and, associated therewith, the red stop light indicator at the rear of the vehicle, indicating those periods during which the brakes are being applied. The stop light indicates, to vehicles following the decelerating automobile, that the driver intends to stop or at least slow down his vehicle. Hence, many "rear end" collisions are avoided.

Certain individuals in the part have recognized the desirability of including a brake light indication on the front of the vehicle; this is useful especially for pedestrians wishing to know if an on-coming vehicle is in the process of deceleration. Often, persons who are pedestrians at night become quite alarmed, and often horrified at the sight of an on-coming vehicle which seems to be bearing down upon them at a substantial rate of speed. It would be most comforting to such pedestrians were they to realize that the driver of the on-coming vehicle recognizes the presence of the pedestrian and is applying his brakes.

One of the major difficulties in this field is that state laws prohibit privately owned vehiclee such as automobiles, buses, trucks, and the like to display any red lights at the front of the vehicle. This is for the purpose of restricting red light usage to public emergency vehicles such as police cars, ambulances, fire engines, and so forth. An immediate problem, hence, is to provide some type of brake light indicator, to be disposed on the front of a vehicle, wherein the indication is not in conflict with state laws. In this regard the inventor actually chooses to spell-out a brake light indication at the front of a vehicle, this so that a redlight indication at the vehicle front is avoided. This also differentiates for the pedestrians, private vehicles from police cars or other vehicles whose red light indications may not be related in any way at all to the braking of the vehicle in question.

A second difficulty to which the present invention addresses itself is that of side indications of the front brake light. It is most desirous to have side indications on both sides of the brake light, and yet have the brake light constructed such that side lenses or windows are illuminated only when the lights within the brake light housing are on. No visual indications are wanted from an external light source, which might otherwise send light through one side-window of the brake light and out the other side. The invention accommodates this feature by supplying, in a preferred form of the invention, a pair of brake light bulbs separated by a partition of sufficient width as to preclude the passage of light between opposite side windows or lenses of the light housing. In this manner, extraneous light sources as might present false indications cannot be involved in inadvertent brake light illumination.

Accordingly, a principal object of the present invention is to provide, in combination with a vehicle, a new and improved brake light for disposition at the front of the vehicle.

An additional object is to provide for vehicles a brake light means incorporating side windows and suitable light partitions, the latter blocking light transmission from one side window to another.

An additional object of the invention is to provide for a brake light indication in the front of the brake light used, and this is such a manner that reference to the brake light system is actually spelled out, thereby avoiding violation of state laws, confusion of emergency vehicles, and other undesirable features.

A further object is to give both to viewers in front of an on-coming vehicle and to those at the side thereof, visual indication as to when the brake light system is being manipulated.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing in which:

Figures 1, 2, 3:
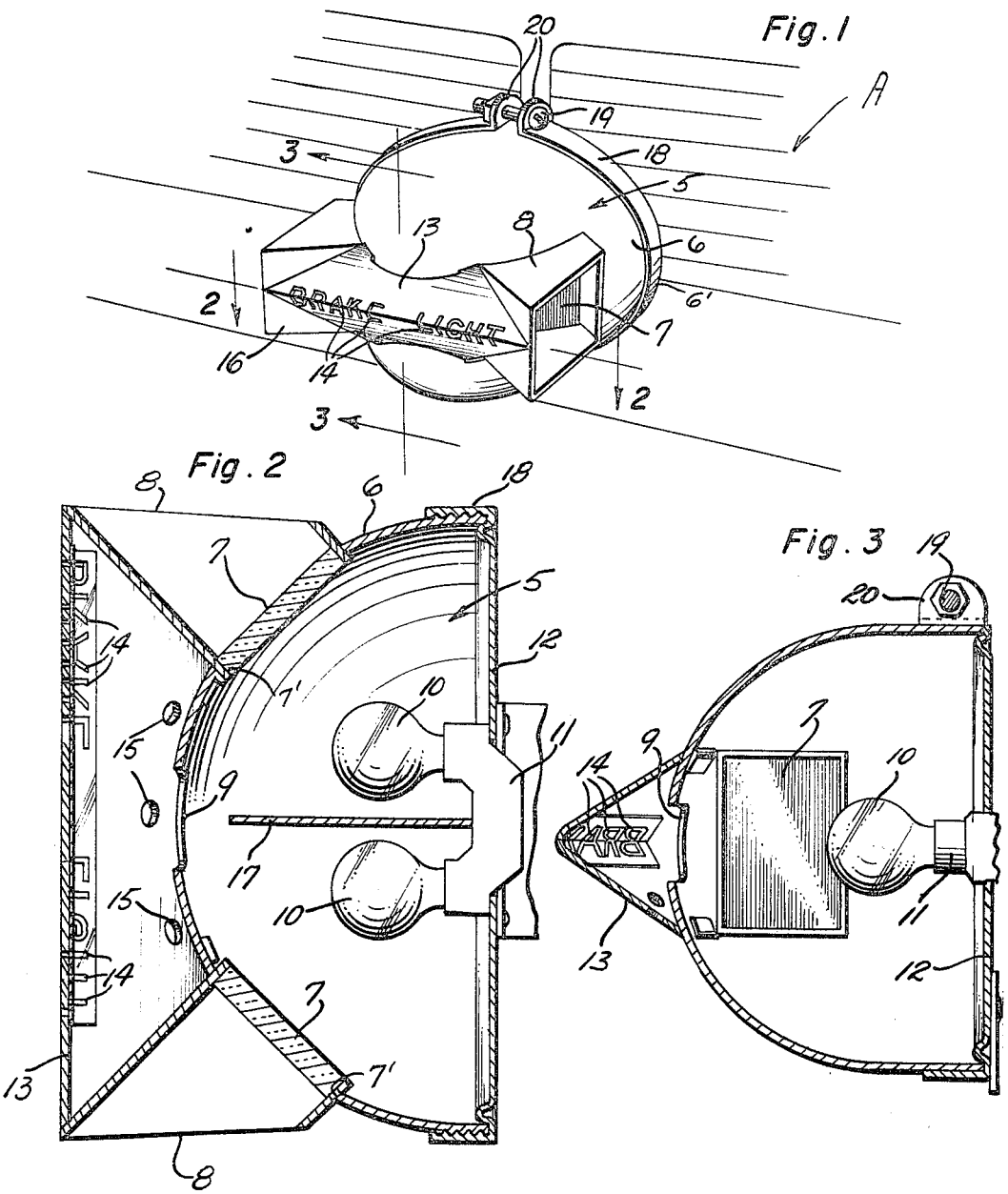
FIGURE 1 is a pictorial view of this invention mounted on the front end of an automobile.
FIGURE 2 is a sectional view of this invention, taken substantially along line 2—2 of FIGURE 1, and viewed in the direction indicated by the arrows.
FIGURE 3 is an other sectional view of this invention, taken substantially along line 3—3 of FIGURE 1, and viewed in the direction indicated by the arrows.

Referring to the drawing, and initially to FIGURE 2, it will be seen that this invention 5 embodies housing 6 of the light that may be any automobile light now on the market that has been modified to meet the requirements of this particular invention. As shown, housing 6 is attached to front portion 6' of vehicle A by clamp 18.

This invention includes the making of an opening 7' in each side of the housing 6 in which is suitably secured a respective red lens 7; each lens 7 is encompassed by a hollow rectangular outwardly projecting hood 8 that is secured to the aforesaid body 6 of the light by any desired means consistent with good automotive lamp manufacturing practice. The aforesaid housing 6 of the light is also provided with a spaced and front showing opening 9 through which light will shine from the two electric bulbs 10 that are located in the double light socket 11. The latter is located in the removable back 12 of the aforesaid housing of the light 6, as best shown in FIGURE 2 of the annexed drawing.

Although not previously stated, the housing 6 of this brake light may be made either of red glass or of its equivalent, or from metal according to the desires of the manufacturer.

Returning once more to the annexed drawing, it will be seen that this invention is provided with a metal light shield-type lens 13 that has the configuration of a horizontally disposed letter V when viewed in the manner shown in FIGURE 3 of the drawing. The aforesaid metal light shield-type lens 13 is provided with cut-outs 14 that form the words BRAKE LIGHT when this invention is viewed from the front. One optional form of this light shield is to make the same out of frosted plastic, and to have the letters painted in black thereon, spaced drain openings 15 may be disposed in the bottom thereof.

To complete the structure, there is provided a retaining band 18 that encompasses the external surface and rearmost portion of the aforesaid housing 6 in order to secure the housing to the removable back 12. This is accomplished by means of the externally located screw 19 that passes through the two upturned ends 20 of the aforesaid band 18, as one can see by examining the upper portion of FIGURE 1 of the annexed drawing. It should be noted that the method of securing the aforesaid retaining band 18 in place can also be accomplished, for example, by the alternate construction shown in the previously mentioned FIGURE 2 of the drawing, where it is noted that the band 18 can be screwed onto the body 6 of the invention rather than be retained by the previously mentioned screw 19.

It is obvious to anyone experienced in the automotive and electrical arts that the aforesaid double light socket 11 has its electrical terminals so connected by electric wires, which for convenience are not shown in any of the three views of the annexed drawing, so that the braking mechanism and electric system cause the two electric light bulbs 10 to light when the brakes of the vehicle are applied, thus warning anyone in front of the vehicle that the brakes are being applied.

Of special importance in the present invention is the inclusion of a partition 17, see FIGURE 6, which may be an integral part of housing 6 and therein positioned between the two lights 10. It is noted that the partition 17 is dimensioned to be sufficiently wide such that communication between opposite side lenses 11 and their corresponding side openings 7' is substantially completely interrupted. Partition 17 serves the very important function of precluding transmission of light from an external source through one lens 7 into the interior of the housing 6 and outwardly through the remaining lens 7. Hence, a viewer will see a light indication through a particular lens 7 only when the lights 10 are on and not when light is being transmitted into the housing from an external source. Hence, a viewer, in seeing a side lens 7 illuminated, will know that the brake light system associated with the illumination resulting indicates that the brake system associated with lights 10 is being actuated.

In operation then, let us assume that the viewer is present in a cross walk and sees an approaching vehicle. If the vehicle is slowing down the phrase "BRAKE LIGHT" is clearly spelled, resulting from the illumination of lights 10. Again, as described previously and as is well known in the art, the vehicle driver in actuating the brake will actuate suitable electrical circuitry, such as that shown in the United States Patent Nos. 1,893,369 and 1,727,522, so that the spelled illumination "BRAKE LIGHT" will appear. In the absence of such an indication, a pedestrian might well be apprehensive about the approaching vehicle, wondering whether or not the vehicle is actually slowing down. Thereafter, upon seeing the brake light indication on the front of the vehicle, the pedestrian can safely continue to traverse across a street, having confidence that the driver is aware of his presence and is decelerating his vehicle.

Assume a second case wherein a pedestrian is starting to cross a street and a vehicle is approaching from his right. Where the driver of the vehicle actuates his braking system, the lights 10 will be illuminated, thus, illuminating the lenses 7. The pedestrian in noting that the lenses 7 are illuminated will understand that the driver is slowing his vehicle.

It is important that the lenses 7 either have suitable braking indicia and, preferably, will be red in color to correspond with the red rear brake lights on the market. Red is a standard which is accepted as indicating a "STOP." Upon seeing such illumination the pedestrian will know the driver is in the process of stopping. It is noted that the illumination through the lenses 7 will occur only when the lights 10 are on because, again, of the inclusion of a partition 17 which blocks the passage of light through and between the lenses 7 (as might otherwise be produced through the illumination of a source external to the light housing 6). Upon seeing a window 7 illuminated, the pedestrian knows the lights 10 are on and, hence, that the braking system is being actuated.

It is important to note that the housing is so designed such that the side lenses face only to the side, and that the red indications on the lenses 7 cannot be seen to the front of the vehicle. This complies with uniform safety regulations in all states indicating that only emergency vehicles such as police cars and fire engines can include a red indication at the front thereof. The present invention accommodates the standardization of the industry in that a phrase referring to the braking system is specifically spelled out at the front of the light 13.

What is provided, hence, is the novel signal light means mountable to the front of a vehicle, wherein the signal light indicates to a passer-by or to other drivers whether or not the vehicle having the light is in the process of deceleration, through actuation of the braking system thereof. Front viewers of the vehicle will see a visual spelled indication relating to the braking system of the vehicle. Such will appear lighted only when lighting means within the light housing are illuminated. Those persons situated to the side of the approaching vehicle will see red indications reflections, referring to the braking system of the vehicle. Red indications through the side windows 11 will appear only when the lights 10 are on. (Refer again to the discussion relating to partition 17.)

I claim:

1. In the combination of a vehicle having a braking system and brake light means mounted to the front of said vehicle: an improvement wherein said brake light means comprises a housing having light-transmitting front and side openings at its front and opposite sides, respectively, said side openings being recessed within said housing and facing angularly to its respective side and forward; plural light means operably disposed within said housing and constructed for selective activation by the vehicle's braking system, said light means being a light communication with said front opening and in respective light communication with said side openings; partition means disposed between said light means and positioned for blocking light communication between said side openings; and braking indicia lens means integral with said housing for covering said openings, said braking indicia lens means covering said front opening spelling reference to the braking system of said vehicle, and said braking indicia lens means covering respective ones of said side openings being recessed in said housing and being red in color.

2. In the combination of a vehicle having a braking system and a front portion, and a brake signal light mounted to said front portion of said vehicle; and improvement wherein said brake signal light comprises a housing having a light transmitting front and side openings at its front and opposite sides respectively, said side openings being recessed within said housing and facing angularly to its respective side and forward; a pair of light means operably disposed within said housing and constructed for selective activation by the vehicle's braking system, said light means being a light communication with said front opening and with respective ones of said side openings; partition means disposed between said light means and between said side openings for blocking light communication between said side openings of said housing; and braking indicia lens means mounted to said housing for covering said openings, and said braking indicia lens means covering respective ones of said side openings being recessed in said housing and being red in color.

References Cited

UNITED STATES PATENTS

| | | | |
|---|---|---|---|
| 1,586,242 | 5/1926 | Duthie | 340—84 |
| 1,659,879 | 2/1928 | Karras | 340—87 |
| 2,241,741 | 5/1941 | Schmitt | 340—84 X |
| 2,338,748 | 1/1944 | Watkiss | 340—87 |

JOHN W. CALDWELL, Primary Examiner

M. R. SLOBASKY, Assistant Examiner

U.S. Cl. X.R.

340—87, 107